United States Patent
Fan et al.

(10) Patent No.: US 7,823,216 B2
(45) Date of Patent: Oct. 26, 2010

(54) PROBE DEVICE FOR A METROLOGY INSTRUMENT AND METHOD OF FABRICATING THE SAME

(75) Inventors: Wenjun Fan, Oxnard, CA (US); Steven F. Nagle, Santa Barbara, CA (US)

(73) Assignee: Veeco Instruments Inc., Plainview, NY (US)

( * ) Notice: Subject to any disclaimer, the term of this patent is extended or adjusted under 35 U.S.C. 154(b) by 440 days.

(21) Appl. No.: 11/833,104

(22) Filed: Aug. 2, 2007

(65) Prior Publication Data

US 2009/0031792 A1    Feb. 5, 2009

(51) Int. Cl.
*G01Q 70/16* (2010.01)
(52) U.S. Cl. .................................... 850/60
(58) Field of Classification Search ............ 850/60
See application file for complete search history.

(56) References Cited

U.S. PATENT DOCUMENTS

| | | | | |
|---|---|---|---|---|
| 4,916,002 A | * | 4/1990 | Carver | 428/139 |
| 5,021,364 A | | 6/1991 | Akamine et al. | |
| 5,066,358 A | | 11/1991 | Quate et al. | |
| 5,266,801 A | * | 11/1993 | Elings et al. | 850/40 |
| RE34,489 E | * | 12/1993 | Hansma et al. | 250/559.23 |
| 5,282,924 A | * | 2/1994 | Bayer et al. | 216/2 |
| 5,319,961 A | | 6/1994 | Matsuyama et al. | |
| 5,412,980 A | * | 5/1995 | Elings et al. | 73/105 |
| 5,811,017 A | | 9/1998 | Matsuyama | |
| 5,883,387 A | * | 3/1999 | Matsuyama et al. | 850/59 |
| 6,027,951 A | | 2/2000 | MacDonald et al. | |
| 6,066,265 A | | 5/2000 | Galvin et al. | |
| 6,139,759 A | | 10/2000 | Doezema et al. | |

(Continued)

FOREIGN PATENT DOCUMENTS

EP    413042 A1 * 2/1991

OTHER PUBLICATIONS

Micro Cantilever for AC (dynamic) mode AFM, Olympus Technical data of silicon cantilevers, Dec. 6, 2007, 4 pages, mhtml:file://C:\Documents%20and%20Settings\gjh\Local%20Settings\Te.

(Continued)

*Primary Examiner*—Thomas P Noland
(74) *Attorney, Agent, or Firm*—Boyle Fredrickson, S.C.

(57) ABSTRACT

A method of producing a probe device for a metrology instrument such as an AFM includes providing a substrate having front and back surfaces and then forming an array of tip height structures on the first surface of the substrate, the structures having varying depths corresponding to selectable tip heights. The back surface of the substrate is etched until a thickness of the substrate substantially corresponds to a selected tip height, preferably by monitoring this etch visually and/or monitoring the etch rate. The tips are patterned from the front side of the wafer relative to fixed ends of the cantilevers, and then etched using an anisotropic etch. As a result, probe devices having sharp tips and short cantilevers exhibit fundamental resonant frequencies greater than 700 kHz or more.

15 Claims, 7 Drawing Sheets

U.S. PATENT DOCUMENTS

| | | | |
|---|---|---|---|
| 6,156,216 | A | 12/2000 | Manalis et al. |
| 6,740,876 | B2 | 5/2004 | Miyatani et al. |
| 6,886,395 | B2 | 5/2005 | Minne |
| 6,941,798 | B2 | 9/2005 | Yamaoka et al. |
| 7,182,876 | B2 * | 2/2007 | Nam .............................. 216/2 |
| 7,250,139 | B2 * | 7/2007 | Espinosa et al. ............ 422/100 |
| 7,444,856 | B2 * | 11/2008 | Prinz et al. .................... 73/105 |
| 2004/0007053 | A1 * | 1/2004 | Lutter et al. ................. 73/105 |
| 2004/0208788 | A1 * | 10/2004 | Colton ...................... 422/68.1 |
| 2006/0073627 | A1 * | 4/2006 | Park et al. ..................... 438/52 |
| 2008/0223119 | A1 * | 9/2008 | Phan et al. .................... 73/105 |

OTHER PUBLICATIONS

M.J. Rost et al., Scanning Probe Microscopes Go Video Rate and Beyond, Review of Scientific Instruments, Apr. 26, 2005, 1 page, 76, 053710, American Institute of Physics.

T. Ando et al., A High-speed Atomic Force Microscope for Studying Biological Macromolecules, Department of Physics, Kanazawa University Jpn., Oct. 23, 2001, 5 pages, vol. 98.

Kanazawa Workshop on Atomic Force Microscopy, Kanazawa University Jpn., Jan. 15-18, 2007, 6 pages.

Short and Thin Silicon Cantilever with Tip and Fabrication Thereof, Description of US2007125160, http://v3.espacenet.com/textdes?DB=EPODOC&IDX=US20071251..., Dec. 6, 2007.

* cited by examiner

PROBE DEVICE FOR A METROLOGY INSTRUMENT AND METHOD OF FABRICATING THE SAME

STATEMENT OF GOVERNMENT INTEREST

This invention was made with United States government support awarded by the following agency: NIST/ATP (Award #70NANB4H3055). The United States has certain rights in this invention.

BACKGROUND OF THE INVENTION

1. Field of the Invention

The present invention is directed to probe devices for metrology instruments such as atomic force microscopes (AFMs), and more specifically a method of producing a probe devices that allows for precise and repeatable control over cantilever length, tip mass and tip height so as to enable fast scanning AFM operation.

2. Discussion of the Prior Art

Several probe-based metrology instruments monitor the interaction between a cantilever-based probe and a sample to obtain information concerning one or more characteristics of the sample. For example, scanning probe microscopes (SPMs), including atomic force microscopes (AFMs), typically characterize the surface of a sample down to atomic dimensions by monitoring the interaction between the sample and a tip on the cantilever probe. By providing relative scanning movement between the tip and the sample, surface characteristic data can be acquired over a particular region of the sample, and a corresponding map of the sample can be generated.

The probe of the typical AFM includes a small cantilever which has a fixed end extending from a base, a sharp probe tip attached to the free end of the lever, generally opposite the base. As discussed further below, the physical properties of the probe greatly impact the scan speed at which the AFM may be operated. In operation, the probe tip is brought very near to or into contact with a surface of a sample to be examined, and the deflection of the cantilever in response to the probe tip's interaction with the sample is measured with a deflection detector, such as an optical lever system, an example of which is described in Hansma et al. U.S. Pat. No. RE 34,489. The probe may be scanned over a surface using a high-resolution three axis scanner acting on the sample support and/or the probe. The instrument is thus capable of creating relative motion between the probe and the sample while measuring the topography, elasticity, or some other surface property of the sample as described, e.g., in Hansma et al. U.S. Pat. No. RE 34,489; Elings et al. U.S. Pat. No. 5,266,801; and Elings et al. U.S. Pat. No. 5,412,980.

AFMs may be designed to operate in a variety of modes, including contact mode and oscillating mode. In contact mode operation, the microscope typically scans the tip across the surface of the sample while keeping the force of the tip on the surface of the sample generally constant. Some AFMs can at least selectively operate in an oscillation mode of operation such as TappingMode™ (TappingMode is a trademark of Veeco Instruments, Inc.) operation. In TappingMode™ operation the tip is oscillated, typically at or near a resonant frequency of the cantilever of the probe. The amplitude or phase of this oscillation is kept constant during scanning using feedback signals, which are generated in response to tip-sample interaction. As in contact mode, these feedback signals are then collected, stored, and used as data to characterize the sample.

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are particularly important measurement devices in many diverse fields including with particular application in connection with the present preferred embodiments semiconductor manufacturing.

A scanning probe microscope, such as an atomic force microscope (AFM) operates by providing relative scanning movement between a measuring probe and a sample while measuring one or more properties of the sample. A typical AFM system is shown schematically in FIG. 1. An AFM 10 employing a probe device 12 including a probe 14 having a cantilever 15. Probe 14 is often a microfabricated cantilever with an integrated tip 17. A scanner 24 generates relative motion between the probe 14 and sample 22 while the probe-sample interaction is measured. In this way images or other measurements of the sample can be obtained. Scanner 24 is typically comprised of one or more actuators that usually generate motion in three orthogonal directions (XYZ). Often, scanner 24 is a single integrated unit that includes one or more actuators to move either the sample or the probe in all three axes, for example, a piezoelectric tube actuator. Alternatively, the scanner may be an assembly of multiple separate actuators. Some AFMs separate the scanner into multiple components, for example an XY scanner that moves the sample and a separate Z-actuator that moves the probe.

In a common configuration, probe 14 is often coupled to an oscillating actuator or drive 16 that is used to drive probe 14 at or near a resonant frequency of cantilever 15. Alternative arrangements measure the deflection, torsion, or other motion of cantilever 15.

Commonly, an electronic signal is applied from an AC signal source 18 under control of an SPM controller 20 to cause actuator 16 (or alternatively scanner 24) to drive the probe 14 to oscillate. The probe-sample interaction is typically controlled via feedback by controller 20. Notably, the actuator 16 may be coupled to the scanner 24 and probe 14 but may be formed integrally with the cantilever 15 of probe 14 as part of a self-actuated cantilever/probe.

Often a selected probe 14 is oscillated and brought into contact with sample 22 as sample characteristics are monitored by detecting changes in one or more characteristics of the oscillation of probe 14, as described above. In this regard, a deflection detection apparatus 25 is typically employed to direct a beam towards the backside of probe 14, the beam then being reflected towards a detector 26, such as a four quadrant photodetector. Note that the sensing light source of apparatus 25 is typically a laser, preferably a visible or infrared laser diode. The sensing light beam can also be generated by other light sources, for example a He—Ne or other laser source, a superluminescent diode (SLD), an LED, an optical fiber, or any other light source that can be focused to a small spot. As the beam translates across detector 26, appropriate signals are transmitted to controller 20, which processes the signals to determine changes in the oscillation of probe 14. In general, controller 20 generates control signals to maintain a relative constant interaction between the tip and sample (or deflection of the lever 15), typically to maintain a setpoint characteristic of the oscillation of probe 14. For example, controller 20 is often used to maintain the oscillation amplitude at a setpoint value, $A_S$, to insure a generally constant force between the tip and sample. Alternatively, a setpoint phase or frequency may be used.

A workstation is also provided, in the controller 20 and/or in a separate controller or system of connected or stand-alone controllers, that receives the collected data from the controller and manipulates the data obtained during scanning to perform point selection, curve fitting, and distance determining operations. The workstation can store the resulting information in memory, use it for additional calculations, and/or display it on a suitable monitor, and/or transmit it to another computer or device by wire or wirelessly. The memory may comprise any computer readable data storage medium, examples including but not limited to a computer RAM, hard disk, network storage, a flash drive, or a CD ROM. Notably, scanner 24 often comprises a piezoelectric stack (often referred to herein as a "piezo stack") or piezoelectric tube that is used to generate relative motion between the measuring probe and the sample surface. A piezo stack is a device that moves in one or more directions based on voltages applied to electrodes disposed on the stack. Piezo stacks are often used in combination with mechanical flexures that serve to guide, constrain, and/or amplify the motion of the piezo stacks. Additionally, flexures are used to increase the stiffness of actuator in one or more axis, as described in copending application Ser. No. 11/687,304, filed Mar. 16, 2007, entitled "Fast-Scanning SPM Scanner and Method of Operating Same." Actuators may be coupled to the probe, the sample, or both. Most typically, an actuator assembly is provided in the form of an XY-actuator that drives the probe or sample in a horizontal, or XY-plane and a Z-actuator that moves the probe or sample in a vertical or Z-direction.

At present, the broadening use of SPM has demanded greater performance over a wider range of applications. For example, AFM metrology is increasingly being utilized in semiconductor fabrication facilities, primarily due to recent developments in automated AFM tools able to acquire sample measurements with higher throughput, such as the Dimension® line of AFMs offered by Veeco Instruments Inc. These tools are able to provide a variety of sub-nanoscale measurements, therefore making AFM a viable tool for measuring, for example, "critical dimensions" of device features such as trenches and vias.

No matter the application, a significant limitation to AFM performance is often the speed at which the AFM can scan the sample. As mentioned previously, the construction of the probe device significantly impacts scan speed. Two primary characteristics of probe devices usable for fast scanning applications are a sharp tip and precise control over cantilever dimensions. Techniques are known for producing probes with sharp tips but they are typically low yield and often provide only limited control over the length of the cantilever which ideally is maintained at less than about 50 microns.

More generally, to enable fast scanning in scanning probe microscopy, control must be maintained over the resonant frequency of the cantilever as well as its spring constant, while the damping characteristics of the probe when oscillating must also be considered. These factors are primarily controlled by geometric factors associated with the probes including length of the cantilever, width of the cantilever, cantilever thickness and tip height. As noted, to maintain high yield and performance, precise control of this geometry should be maintained.

In this regard, techniques for producing silicon nitride cantilevers with integral sharp tips are known. For example, in U.S. Pat. No. 5,066,358 to Quate et al. describes a technique for producing silicon nitride probe devices. However, according to the Quate et al. technique, it is difficult to scale to small cantilevers with precise control over the cantilever length, as well as the mass and the height of the silicon tip. More particularly, in processes such as those disclosed in the '358 patent, as well as in U.S. Pat. Nos. 5,021,364 and 5,811,017, electrochemical etch stops must be used in conjunction with a heavily doped silicon or silicon-on-insulator wafers. This is due to the fact that when the required electrochemical wet etch is performed (FIG. 4 of the '358 patent), some structure is required to halt the etch when forming the cantilever (36 in the '358 patent). Doped silicon provides the appropriate structure, thus allowing the silicon to remain intact with the backside etch.

However, there are significant drawbacks to using either heavily doped silicon or silicon-on-insulator wafers. Problems with prior art techniques include high cost, lower production yields, stress bending of cantilevers, and rough backside surfaces that interfere with successful use of the optical lever technique. Many prior art techniques also have issues with errors associated with mask alignment, especially frontside to backside alignment. These issues create a typical manufacturing tolerance for cantilever length and/or tip position of roughly ±5 µm. This manufacturing tolerance makes it difficult to manufacture small cantilevers, for example smaller than 50 µm, or worse smaller than 10 µm, with sufficient accuracy concerning its cantilever spring constant, resonant frequency and tip offset from the free end of the cantilever.

Tip formation is also less than ideal with these known techniques, exhibiting undesirable variations in tip height and tip sharpness. As a result, conventional techniques do not exist that produce short cantilevers through parallel processing on the wafer scale with high yield sharp tips (e.g., tip radius less than 20 nm, for example) and tip heights less than about 4 microns.

As a result, the field of atomic force microscopy was in need of a microfabrication process that produces an AFM probe having an integral tip, and provides precise control over cantilever length to produce probe devices having cantilevers with lengths less than 50 µm, and preferably less than 40 microns and more preferably less than 10 microns.

SUMMARY OF THE INVENTION

The preferred embodiments are directed to a process of producing small cantilevers for high speed AFM scanning with high production yield, and without the limitations of known techniques. The preferred techniques avoid using an electro-chemical etch to define tip height and thus do not require highly doped silicon or SOI wafers to produce the probe devices. Control over cantilever length in comparison to known processes (e.g., about +/−5 microns) is greatly improved, with the present techniques being capable of accuracy in the range of about +/−1 micron. Moreover, precise control is maintained over silicon tip mass and tip height. Short cantilevers can thus be more readily and reliably produced with high yield. In that regard, yield is further facilitated by providing patterned holding tabs that minimize unintentional dislodging of the resultant thin levered prove devices from the substrate.

According to one aspect of the preferred embodiment, a probe device for a probe microscope includes a base, as well as a cantilever made of silicon nitride. The cantilever has a fixed end and a free end with the free end supporting a silicon tip positioned within about 5 µm of the free end. In this case, the cantilever has a length less than about 50 µm, while a height of the tip is less than about 4 µm with the effective tip radius being less than about 20 nm.

In another aspect of this embodiment, the fundamental resonant frequency of the cantilever is greater than 500 kHz.

In a further aspect of this embodiment, the quality factor Q of the cantilever in air is less than about one-hundred when the tip is interacting with a sample.

According to yet another aspect of this embodiment, the height of the tip is substantially determined by monitoring an etch on one side of a wafer. The etch reveals at least one of a series of thickness monitor features formed on a side of the wafer opposite the one side.

In a still further aspect of this embodiment, the etch is terminated once a thickness of the wafer substantially corresponds to a selected tip height. In this case, the etch is terminated by visually monitoring the etch.

According to another aspect of this preferred embodiment, the etch is terminated based on an etch rate associated with the etch.

According to a still further aspect of this embodiment, the tip is positioned by measuring, during fabrication, a distance between a tip pattern and the fixed end. The fixed end of the cantilever is typically formed as a result of the backside etch used to reveal tip height monitor features. Importantly, the fixed end of the cantilever is visible from the opposite side of the wafer (the front side), thus allowing the distance between the tip pattern and the fixed end to be measured.

In a further aspect of this embodiment, the probe device is formed from a silicon wafer. Notably, the silicon wafer may be a bulk single crystal silicon wafer.

In another aspect of this preferred embodiment, a thickness of the cantilever is less than about 2 microns, with a tolerance of about 0.1 micron.

According to another aspect of this embodiment, the thickness is less than about 1 micron. Moreover, the thickness is substantially uniform and the tolerance can be maintained among a plurality of probe devices. Further, the plurality of probe devices may include probe devices formed from different wafers.

According to another preferred embodiment, a probe device for a probe microscope includes a base and a cantilever made of silicon nitride. The cantilever has a fixed end and a free end and supports a silicon tip positioned within about 5 μm of the free end. In this embodiment, the tip height is less than about 4 μm, the effective tip radius is less than about 20 nm, and the cantilever has a fundamental resonant frequency of greater than about 500 kHz. Ideally, the quality factor Q of the cantilever in air is less than about 100 when the probe tip is interacting with a sample.

According to another aspect of this preferred embodiment, the resonant frequency is greater than about 700 kHz.

In yet another aspect of the preferred embodiment, the resonant frequency is greater than about 5 MHz.

According to a still further aspect of the preferred embodiments, a length of the cantilever is less than about 50 μm with a precision less than about +1-5 μm.

In a still further aspect of the preferred embodiments, the cantilever length is less than about 50 μm with a precision less than about +/−1 μm.

According to a still further aspect of the preferred embodiments, the tip height is substantially determined by monitoring an etch on one side of a wafer, and wherein the etch reveals at least one of a series of tip height monitor features formed on a side of the wafer opposite the one side. Here, the etch is terminated once a thickness of the silicon wafer substantially corresponds to a selected tip height.

In yet another aspect of the preferred embodiments, a method for fabricating a probe for a probe microscope includes providing a bulk single crystal silicon wafer, etching a region of the silicon wafer to a desired thickness and then depositing silicon nitride on the backside of the etched silicon region to provide material to form the lever. Thereafter, the tip is patterned and etched from the etched silicon region, and then the cantilever is patterned and etched from the silicon nitride. The cantilever may have a length of less than about 50 μm and the tip may be positioned within about 5 μm of the free end of the cantilever. The resultant tip is sharp, with an effective radius less than about 20 nm.

According to a still further aspect of the preferred embodiments, the tip has a height less than about 4 μm.

In yet another aspect of the preferred embodiment, a tip height monitor feature is formed to control the etching step.

According to another aspect of this preferred embodiment, the tip height is controlled by monitoring a back side etch of the wafer.

According to a still further aspect of the preferred embodiments, the monitoring step includes at least one of monitoring etch rate and visually inspecting the wafer.

In another aspect of this embodiment, during fabrication, the tip is positioned by measuring a distance between a tip pattern and the fixed end.

In yet another aspect of the preferred embodiment, the probe device is one of an array of probe devices fabricated from the substrate and the yield is greater than about 90%.

According to another aspect of this preferred embodiment, the silicon nitride is supported by a thin film. The thin film may be an oxide.

In yet another aspect of the preferred embodiment, the thickness of the silicon nitride is less than about 2 microns with a tolerance of about 0.1 micron.

According to a still further aspect of this preferred embodiment, probe device yield is maintained greater than about 90%.

In yet another aspect of the preferred embodiment, the tip is oxidation sharpened.

According to another aspect of this preferred embodiment, the tip is pyramid-shaped.

In yet another aspect of the preferred embodiment, a probe device includes a base etched from a bulk silicon substrate/wafer and a cantilever made of silicon nitride. The cantilever has a fixed end and a free end, with a tip being substantially supported by the free end. In these embodiments, the cantilever has a length that is less than about 50 microns which can be produced while maintaining a precision less than about +/−5 microns, and even less than +/−1 micron.

In yet another aspect of the preferred embodiment, a method of fabricating a probe device for a metrology instrument includes producing at least three probe devices each from a different substrate and each having a length less than about 50 microns, wherein a standard deviation of the lengths is less than about 0.5 micron.

In yet another aspect of the preferred embodiment, a probe device for a scanning probe microscope includes a base, a cantilever extending from the base at a substantially fixed end. The cantilever also has a free end, while a tip extends substantially orthogonally from the free end. Ideally, the tip can be maintained within about 50 microns of the substantially fixed end, with a tolerance of about plus/minus 2 microns.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION OF THE PREFERRED EMBODIMENTS

The preferred embodiments are directed to a micro-fabrication technique in which probe devices are lithographically patterned and etched from a substrate such as silicon ideally bulk single crystal silicon wafers. The resultant probe devices are particularly useful for high-speed metrology applications, particularly using AFM, given that the process yields probes having high aspect ratio tips and short cantilevers, and thus large resonant frequencies. According to the invention, the yield of useable probe devices is greatly improved over known methods by maintaining flexibility with regard to the type of substrate that may be employed to produce the probe devices (e.g., the substrate can be bulk silicon that is lightly doped or undoped), as well as providing a scheme in which the tip of the probe device is aligned to the fixed end of the cantilever from the front side of the wafer, without moving the wafer, so as to allow precise control over cantilever length. Probe devices having cantilever lengths less than 50 microns, and more ideally less than 10 microns can be repeatably and reliably produced, even across several wafers, with a standard deviation in the lengths of the cantilevers that are less than about 0.5 micron. Also, a scheme for controlling tip height is employed to produce tips with aspect ratios in a range of about 1 to 3, with tip heights less than about 4 microns, and effective tip radii less than about 20 nm. As a result, probes having fundamental resonant frequencies greater than about 500 kHz, and even greater than 5 MHz, can be produced. To facilitate maximizing yield, the relatively thin probe devices produced according to the techniques described herein are held within the wafer using patterned and etched holding tabs that allow ready removal of the probes, yet substantially prevent inadvertent separation of the probe devices from the wafer.

Figure 1:
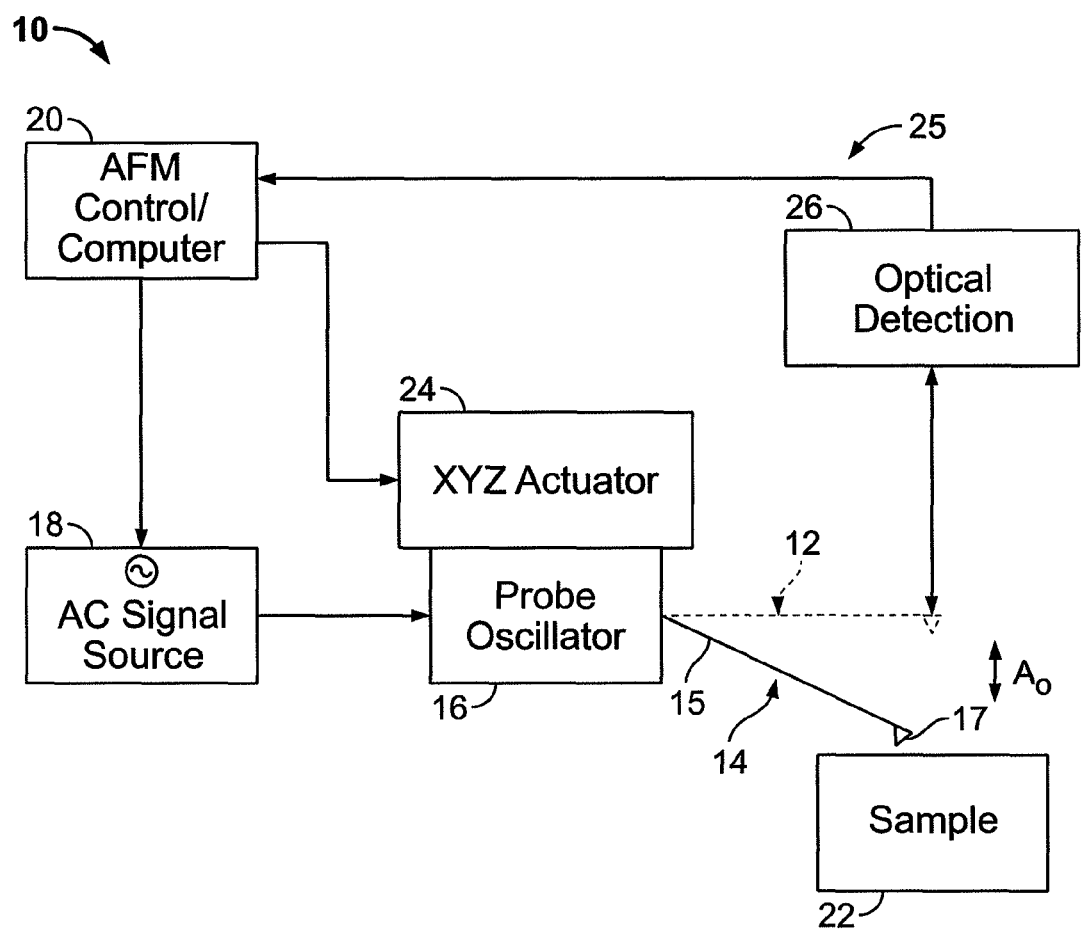
FIG. 1 is a schematic diagram of a prior art AFM, appropriately labeled "Prior Art"
Figure 2:
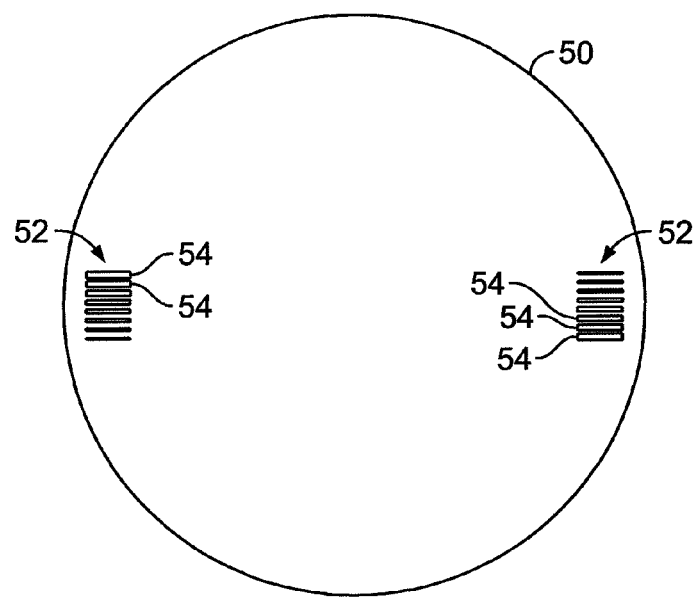
FIG. 2 is a top plan view of a semiconductor wafer for producing an array of probe devices operable in a metrology instrument according to the present invention, illustrating a series of monitor or tip height features patterned on a front side of the wafer on opposed ends of a perimeter of the wafer.

Turning initially to FIG. 2, a top view of a silicon substrate 50 from which an array of probe devices usable for high speed scanning probe microscopy can be fabricated is shown. A series or array 52 of tip height or membrane thickness monitor windows 54 is patterned on at least a portion of the substrate (opposed ends in this case) to not only provide a way to monitor and substantially define a selected probe tip height, as described further below, but also to align the front and back sides of the wafer during processing. These monitor windows are shown on either side of the perimeter of wafer 50, with more or less windows being required based on the uniformity of the membrane etching process that is described below. Notably, controlling probe tip height facilitates achieving large fundamental resonant frequencies and allows the probe device manufacturer to manage squeeze film damping between the probe and sample during SPM operation.

Figure 3:
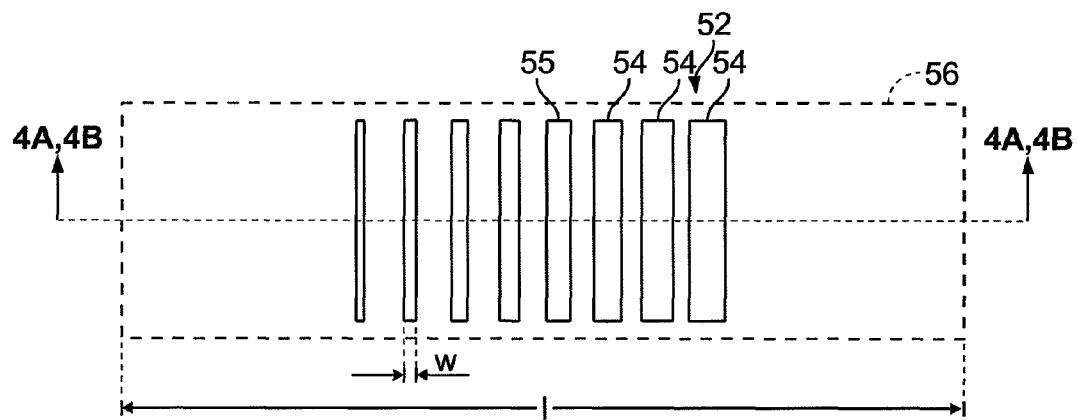
FIG. 3 is a top plan view of the tip height features shown in FIG. 2, also illustrating in phantom a backside reveal feature patterned perpendicularly to the front side monitor features.

Referring next to FIG. 3, the array 52 of monitor windows 54 shown in FIG. 2 is used to substantially define tip height in the following way. Array 52 includes monitor windows 54 having varying widths (in this case, increasing from left to right) that are patterned on the wafer for subsequent etching of the wafer at those locations. In that regard, as the features are etched (preferably using an anisotropic etch), a series of substrate or membrane thickness monitor features or tip height structures in the shape of V-grooves are formed in the silicon substrate, with the V-grooves reaching a depth that is dependent on the width of the patterned monitor feature, as explained immediately below. V-grooves result due to the lattice structure of the silicon. More specifically, the anisotropic etch terminates on particular planes of the silicon, the (111) planes, in this case. Once the (111) planes are reached for the corresponding end points (width-wise) of the patterned feature, the etch terminates and the depth of the feature (i.e., V-groove) is defined. A backside etch is then performed to expose a selected one of the V-grooves and thus produce a wafer membrane that is subsequently used to fabricate tips having a desired height, as described further immediately below in connection with FIGS. 4A and 4B.

Figure 4A:
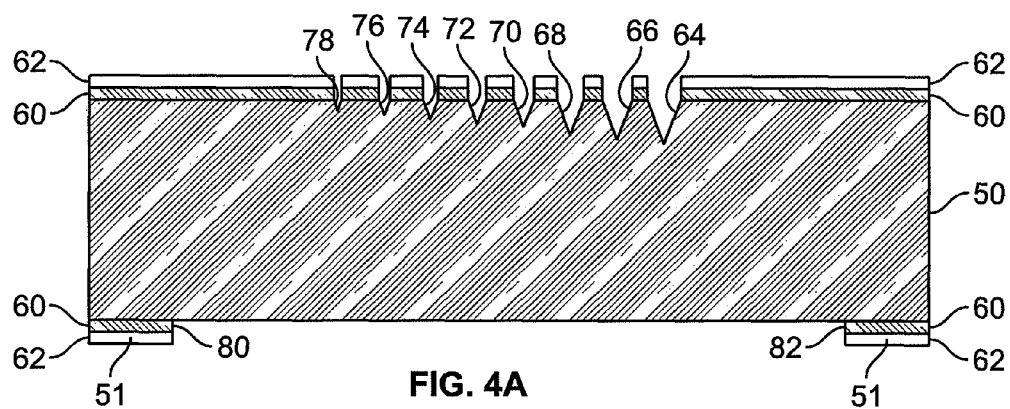
FIG. 4A is a cross-sectional view of the wafer of FIG. 3, taken along lines 4A-4A and illustrating an anisotropic etch of the monitor features to form V-grooves.

Referring to FIG. 4A, using conventional thin film deposition and lithography techniques membrane thickness monitor windows are patterned on the wafer. In one embodiment, starting with a substrate such as a silicon wafer, a layer of oxide 60 (e.g., $SiO_2$) is deposited on the wafer, both sides, and then a layer of silicon nitride 62 is deposited on the oxide. The oxide and nitride act as etch masks for the following process steps. Next, a photoresist is spun onto the oxide and nitride layers and an appropriate mask (not shown) is used to pattern the monitor features on the wafer. More particularly, an array 52 of windows 54 such as that illustrated in FIG. 3 are patterned onto the top surface of the substrate. Thereafter, the silicon is etched anisotropically through array 52 of windows 54 so that membrane thickness monitor features 64-78 in the shape of V-grooves are formed as the etch terminates on the (111) planes of the silicon crystal associated with the end points of the width "w" of the features in FIG. 3. Again, the V-grooves have known depths directly related to the widths of the tip height features.

Figure 4B:
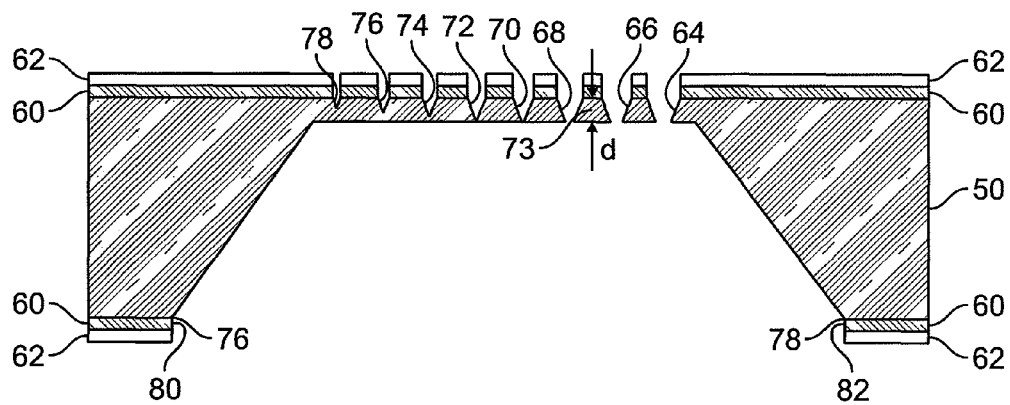
FIG. 4B is a cross-section view of the wafer of FIG. 3 taken along lines 4B-4B, illustrating an anisotropic backside etch.

Next, large windows 56 (FIG. 3) corresponding to the one or more arrays 52 are patterned on the backside of the wafer. The edges 80, 82 of these windows are shown schematically in FIG. 4A. The large windows on the backside are correspondingly aligned to one or more of the membrane thickness monitor arrays 52 using standard alignment features and standard front to backside alignment equipment, for example, an aligner that employs a frontside-backside aligner from the Karl Suss Co. In particular, the major axis of window 56 is positioned substantially perpendicular to the major axes of front side windows 54. This alignment is accomplished so that window 56 accommodates an etch through the wafer directly below membrane thickness monitor array 52, as shown in FIG. 4B.

More particularly, in process, the back side etch is monitored visually from the front side, typically using illumination from the front or back sides. The etch is stopped when the V-groove having a depth corresponding to a selected desired thickness d of monitor membrane 73 (which is directly related to tip height) breaks through to the backside of the wafer, as shown in FIG. 4B. Alternatively, the timing at which deeper V-grooves (for instance, V-groove 68 for desired V-groove 72) break through can be used to predict the appropriate time to stop the etch, i.e., an etch rate can be determined based on visual monitoring of V-groove break through and using that information to determine about when to terminate the etch.

At the same time monitor membrane(s) 73 is being formed, device membranes 115 (shown in FIG. 5A) of the probes of the array of probes being fabricated are etched with a thickness that is substantially the same as the thickness "d" of monitor membrane 73. Again, it is this thickness d of device membrane 115 that is used to control the AFM probe tip height.

Figure 5A:
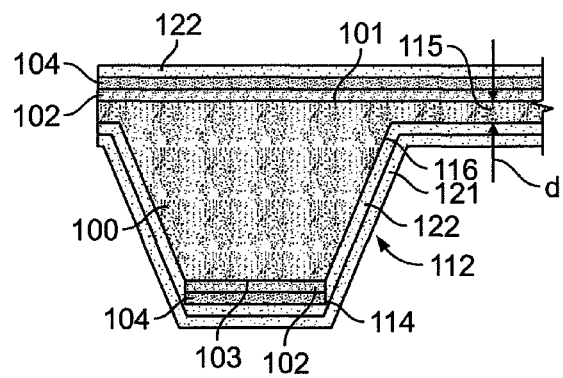
FIGS. 5A-5D are broken away side elevational views of a wafer being processed into a probe according to the present invention.

This formation of the probe device is described in further detail and illustrated schematically in FIGS. 5A-5D. Referring initially to FIG. 5A, layers of silicon dioxide 102 and silicon nitride 104 remain on the wafer 100, both front and back sides, once the monitor membrane 73 is formed to a desired thickness d. In producing membrane 73 with the back side etch, a structure 112 also results. Structure 112 forms the base of the probe device, described further below, which also substantially defines the location of a fixed end 116 of what ultimately will become the cantilever of each probe device.

At this point, a layer of silicon nitride 122 is deposited on the silicon substrate, front and back sides 101, 103, the nitride 122 ultimately being processed to form the cantilever. The formation of nitride layer 122 is important in that the thickness of the layer determines the thickness of the cantilever which as noted earlier is a factor in determining the performance characteristics of the probe device, including its fundamental resonant frequency. By controlling the thickness of the nitride deposition, the cantilever can be made thinner to facilitate a more optimum probe device resonant frequency, thus allowing the probe, and the AFM as a whole, to operate at greater speeds. Nitride thickness may be monitored using any thin film measurement tool, including, for example, an ellipsometer or another similar tool, such as optical tools that measure reflectivity. Alternatively, fourier transform spectroscopy (FTIR), which employs infrared interferometry to measure the thickness of the film, may be employed.

To deposit the nitride 122, low pressure chemical vapor deposition (LPCVD) may be used. LPCVD advantageously provides a nitride layer 122 that is low stress, thereby minimizing the adverse affects inherent to prior SPM probes fabricated, for example, with high stress silicon levers. High stress silicon levers most often require that the stress be compensated (to accommodate lever bending, for instance), thus adding further complexity to the design, and ultimately limiting performance.

For the applications contemplated by the present invention, substantially even thickness is preferably maintained in a range dependent on the length of the lever and the desired fundamental resonant frequency. With the present silicon nitride levers, lever thicknesses less than two microns are desired, and thicknesses less than one micron are possible, with a corresponding tolerance of about 6% or about 0.1 micron. This precise control over lever thickness further facilitates yield, with the present embodiments being able to maintain uniform cantilever thickness within the stated tolerances across a wafer, as well as between wafers.

After the deposition of the silicon nitride layer 122, a support film or layer 121 (e.g., silicon dioxide, a metal, a polymer) can be deposited, as an option. Support film 121 (a metal or a polymer, for instance) may be deposited after the nitride 122 to give the membrane 115 more structural integrity (or reduce stress of the nitride deposition) and/or to provide an etch stop for the formation of the cantilever. By reinforcing the probe device in this way, the patterning of the tip (which occurs in the next step shown in FIG. 5B), can be re-run without compromising the integrity of the device membrane 115. This patterning and re-patterning may be performed if it is determined that initial alignment will not yield cantilevers having the desired length. Ideal positioning of the patterned tip, including the improved accuracy achieved over known techniques, is described further below.

Figure 5B:
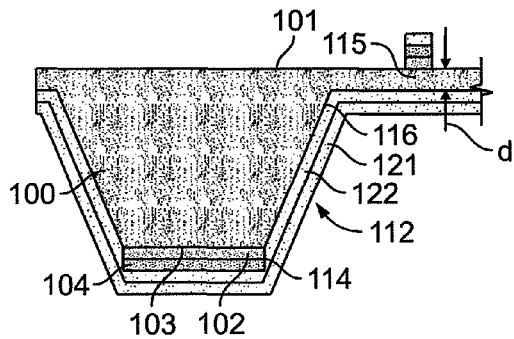
Figure 5C:
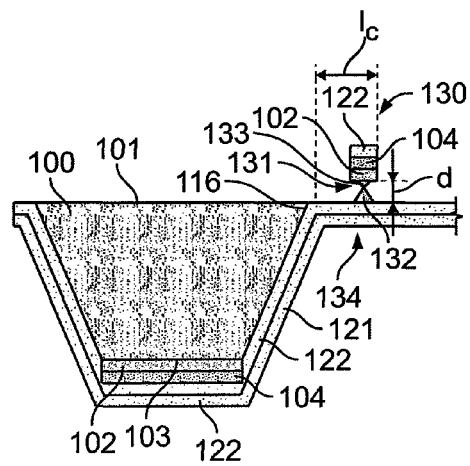

A tip feature 131 is then patterned onto the front side of the substrate as illustrated in FIG. 5B, in this case using global alignment marks. Then, as shown in FIG. 5C, an anisotropic etch is used on the front side to form the generally pyramid-shaped tip. In this case, the width of the base of the tip is substantially defined by the width of the pattern imaged onto the front side silicon nitride 122 (as well as the silicon oxide 102 and nitride 104 therebelow).

More specifically, when performing the front side etch in this way, the geometry of the resultant tip structure typically includes two pyramid-shaped structures 132, 133, disposed one on top of the other, tip-to-tip. Once the etch is complete, the top pyramid 133 breaks from the bottom pyramid 132 thus causing oxide 102, nitride 104, and nitride 122 layers to be removed as well. This leaves a high aspect ratio tip 132 having a height less than the membrane thickness d results. This formation of the tip using an anisotropic etch to terminate the etch on particle facets of the substrate structure (i.e., crystal structure) facilitates producing tips with greater sharpness than known techniques that typically yield tips with rounded distal ends by patterning the surfaces of the tip with conventional lithography techniques (as described, for example, in the '358 patent).

When patterning the tip, especially for the high-speed AFM applications contemplated by the present invention, the location of this patterning is important to establishing overall device geometry, most notably cantilever length, $l_c$. The location of the tip relative to the fixed end of the lever substantially defines the effective length of the lever (except overhang, discussed below), and thus impacts the performance characteristics (e.g., resonant frequency) of the probe device. In this regard, the user first patterns the tip based on global mask alignment associated with producing an array of probe devices. Once written, however, the distance between the patterned tip feature 131 and the fixed end 116 of the cantilever may be less than ideal for achieving the goals of the preferred embodiments. Fortunately, the fixed end of the lever is generally visible from the front side 101. The fixed end of the cantilever, point 116 on the backside, is visible because the deposited silicon nitride film is substantially transparent through the relatively thin silicon membrane, unlike those methods for producing probes having silicon levers. Notably, to further facilitate this viewing, illumination (front or backside) is typically employed.

With point 116 known, the distance between the fixed end 116 and the patterned tip can be relatively accurately measured from the front side. Advantageously, cantilever length can then be substantially confirmed prior to etching the silicon to form the tip. In the event that the alignment between tip feature 131 and fixed end 116 is not acceptable, the probe device fabricator can strip tip feature 131 from the front side and make appropriate position adjustments and re-write the feature in an attempt to produce the desired separation between the tip and the fixed end of the lever. This process can be repeated several times if needed to achieve the desired location of the patterned tip. As noted above, however, multiple stripping and re-writing steps can compromise the integrity of the device membrane, and thus that of the silicon nitride lever. As a result, and as also noted previously, an oxide layer (or a metal or another suitable film) may be used to reinforce the lever to resist membrane rupture during processing.

Figure 5D:
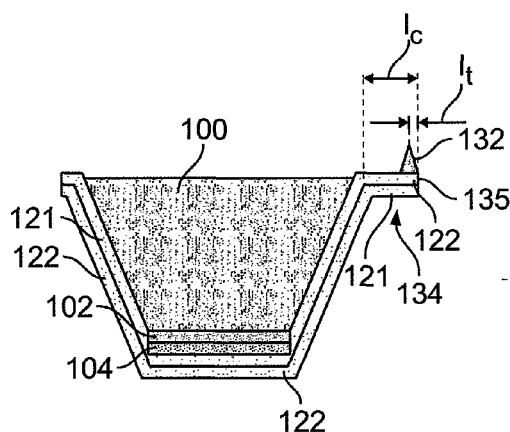
Figure 6:
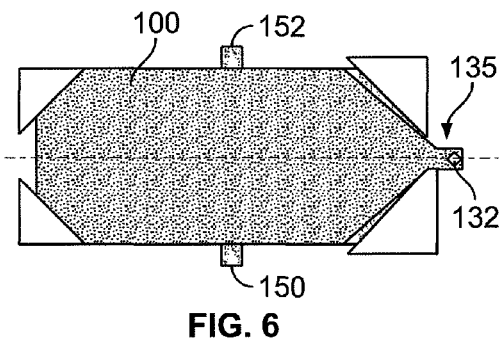
FIG. 6 is a top plan view of a probe device produced according to the steps shown in FIGS. 5A-5E.

In sum, the tip masks can be positioned to pattern tips which can thereafter be measured, during probe device fabrication, to determine their location relative to the fixed end of the corresponding levers. As a result, the present techniques can be used to repeatedly and reliably produce sub-50 micron probe device cantilevers 134 (FIGS. 5D and 6). Ideally, probe devices having cantilevers with lengths that are less than about 50 microns, and even less than about 10 microns, can be repeatedly produced, across wafers. Moreover, fundamental resonant frequencies greater than 700 kHz, or greater than 1 MHz, or even greater than 5 MHz, can be realized with the present probe devices, with quality factors Q less than 100 in air when the tip is interacting with the sample.

Turning to FIG. 5D, the cantilever is then patterned and etched from the front side, thus yielding, for example, the structure show schematically in FIG. 6. Referring more specifically to FIG. 5D, with the tip 132 formed, the size and shape of the lever is patterned from the front side. A free or distal end 135 of what will become lever 134 is patterned with appropriate masking and defines an overhang or tip offset, $l_t$, defined as the distance between end 135 and an axis through the apex of the tip and generally orthogonal to the lever. Tip offset, similar to the other probe device geometry discussed herein, is important to the overall performance substantially characteristics of the probe device and can significantly limit the speed at which the SPM can reliably image a sample if made too large. Using the present techniques, tip offset, $l_t$, can be maintained within at least about 5 μm of the free end 132 of the fabricated lever. Notably, the tip is pyramid-shaped and the outside edge of the base of the pyramid may lie substantially in line with the outer edge of the free end of the lever. As understood in the art, for optimum AFM operation, only the tip of the probe device interacts with the sample, therefore, by maintaining tip offset, $l_t$, less than about 5 microns the chance that the free end 135 of the probe device interacts with the sample during AFM operation is significantly reduced over previous techniques, which typically produce probe devices with much larger, and less reliably controllable, overhang.

Ideally, the amount of overhang is controlled during probe fabrication. Notably, tip offset be reliably controlled using a stepper with a frontside alignment tool having at least 100 nm position accuracy. However, such equipment is expensive. Therefore, other conventional alignment techniques may be used. According to one alternative, the resist used to pattern the lever may be a negative photoresist which produces a mask that is transparent when patterning the lever. In this way, with tip 132 visible, the mask may be positioned so that the distal end 135 can be accurately placed so that offset, $l_t$, can be carefully controlled.

Figure 7A:
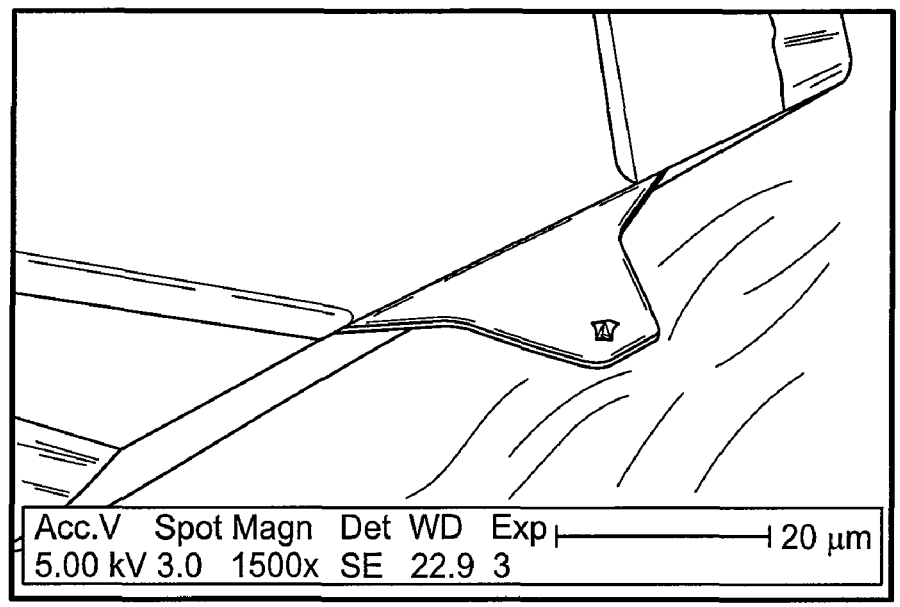
FIG. 7A is an isometric image of a probe device produced according to the present invention.
Figure 7B:
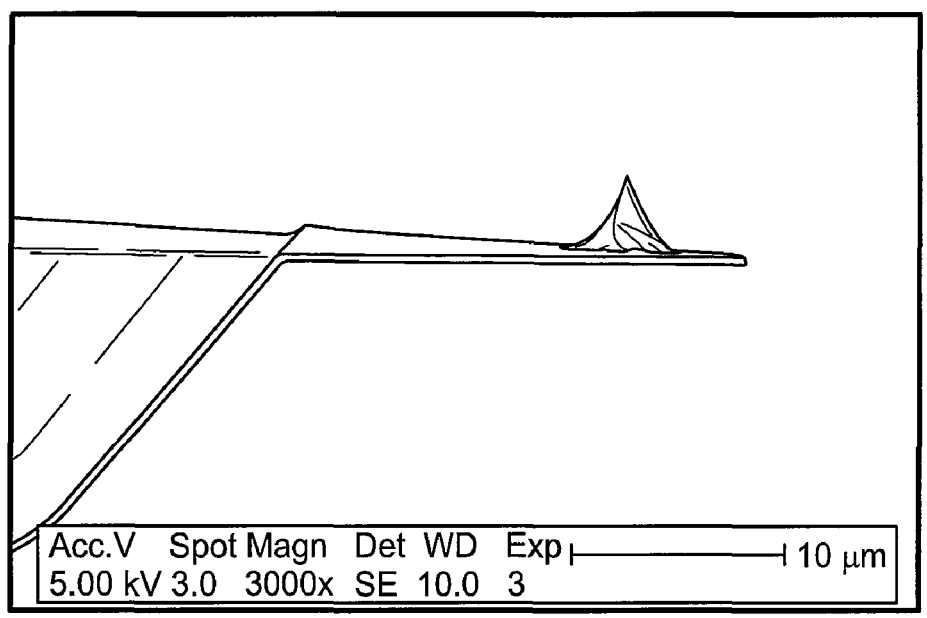
FIG. 7B is a side-elevational image of the probe device of FIG. 7A.

An image of a cantilever produced according to the preferred embodiments is shown in FIG. 7A in which a sub-30 micron cantilever length is produced with a tip height less than about 10 microns. FIG. 7B illustrates the probe device of FIG. 7A from the side. Overall, by using the present techniques, cantilever size and shape can be precisely and repeatedly controlled to produce high yield levers suitable for high speed AFM operation. Moreover, probe devices having sub-50 micron cantilever length can be maintained even among several wafers with a standard deviation of less than about 0.5 micron.

Figure 8:
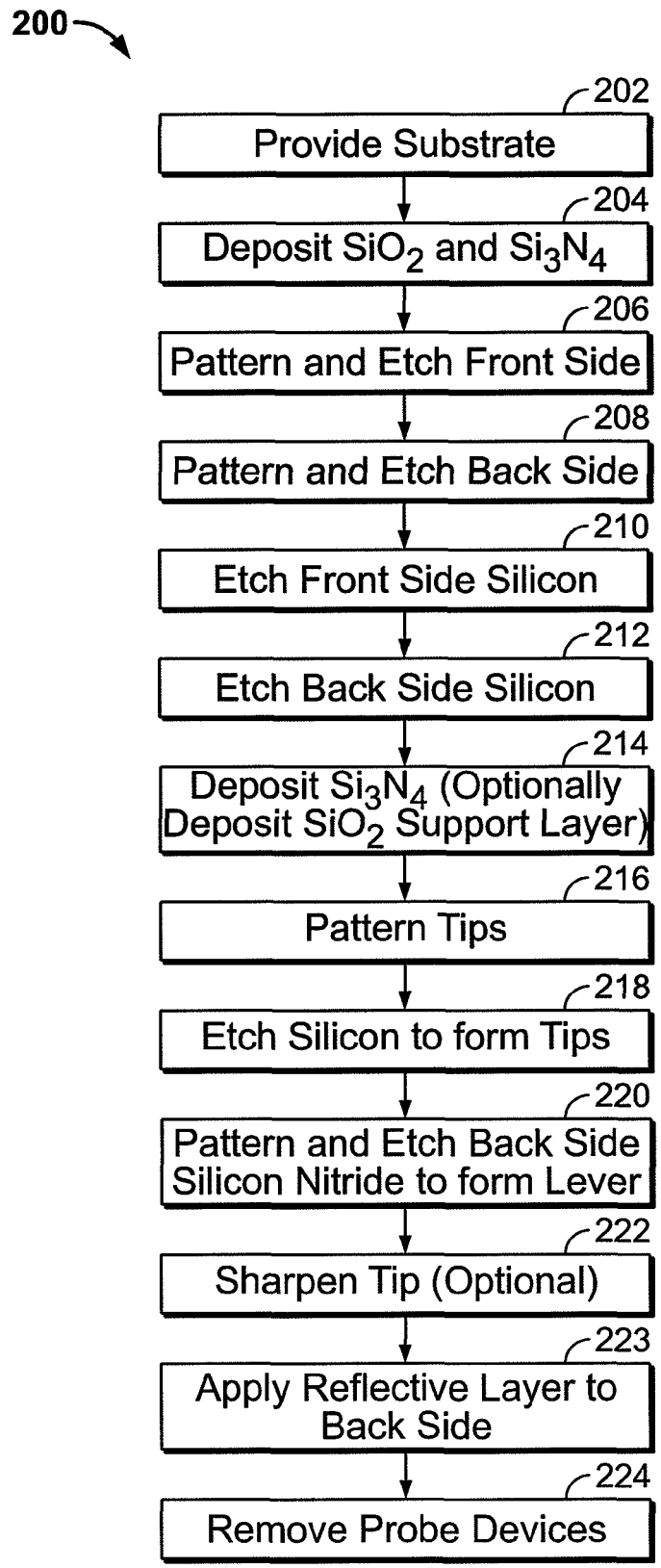
FIG. 8 is a flow chart illustrating a method of producing a probe device according to the present invention.

Turning to FIG. 8, a method 200 of producing these probe devices is shown. Initially, in Block 202 a substrate is provided. As highlighted previously, the substrate is typically a silicon substrate, however, one advantage of the preferred embodiments over known techniques is that the wafer can be a bulk silicon wafer, i.e., it does not have to be doped silicon or a costly silicon on insulator (SOI) wafer, due to the fact that the backside silicon etch is controlled by a particular monitoring technique. Again, because the method is sufficiently robust to use an undoped silicon substrate, several advantages are realized. Namely, front side alignment of the tip can be performed to repeatedly produce probe devices having sub-50 micron cantilevers. And, high aspect ratio tips with sharp distal ends are realized given that an anisotropic etch is used to form the four-sided tip structure.

Finally, an additional highly reflective coating maybe employed on the backside of the silicon nitride lever after removing the optional supporting layer to provide sufficient reflectivity for light impinging on the surface of the lever during AFM operation. Since no special doping is used, the method yields a smooth silicon surface upon generating the silicon membrane. This provides a smooth silicon nitride surface upon which the reflective layer can be deposited, this is contrary to the highly doped silicon etch stop method which has a rough surface after etching, yielding a rough surface upon which the reflective film is deposited.

Turning again to method 200, silicon oxide and silicon nitride are then deposited on both sides of the wafer in Block 204. Next, an array of the membrane thickness monitor windows are patterned onto the nitride/oxide and etched from the front side in Block 206 to expose the silicon in those areas. In Block 208, the large back side alignment reveal windows are patterned onto the nitride generally opposite the front side array (e.g., at about ninety degrees to the front side monitor array) and then etched to expose the backside silicon of the wafer to create reveal windows aligned with the array of front side windows, as described above.

At this point, in Block 210, the front or top side monitors corresponding to the patterned windows of the array are etched so that V-grooves with particular depths are formed with the (111) silicon facets of the wafer exposed. In the meantime in Block 212, the back side silicon is etched to expose the large reveal windows. Moreover, because the rectangular reveal opening is aligned perpendicularly to the series of patterned V-groove or tip height features on the top side, sequential through-holes are generated when the etching of the back side silicon reaches the bottom of the V-grooves formed on the front side. By monitoring the generation of the through-holes (and, for example, the silicon etching rate, as described previously), the anisotropic back side etching step in Block 212 can be stopped to control the silicon membrane thickness. As a result, the monitor membrane (73 in FIG. 4B) is formed. More specifically, by observing the progress of the etch and identifying which membrane thickness monitor features (i.e., V-grooves) are revealed (FIG. 4B) the etch may be terminated. Again, the fabricator can stop the etch by either directly identifying the membrane thickness monitor feature directly related to the desired tip height, and/or by monitoring the etch rate and determining the duration of the etch expected to yield the desired silicon membrane thickness (i.e., to reveal the V-groove directly related to the desired tip height). Often, some combination of visually inspecting V-groove breakthrough and monitoring etch rate is used to precisely control substrate thickness. Once the etch is terminated, a silicon membrane having a thickness sufficient to pattern and etch the tip is produced.

Notably, concurrent with the formation of the monitor membrane (which, again, defines tip height), the support or base section of each probe device of the array of probe devices being produced is formed. Moreover, the device membrane (115 in FIG. 5A) is also formed.

Next, in Block 214, silicon nitride is deposited over the entire wafer. Then an optional support layer (for example, silicon dioxide) may be formed on the wafer after the nitride deposition to act as an etch stop for the lever and/or to provide support for the nitride, but it is not necessary. Method 200 then includes, in Block 216, patterning the tips of the probe devices. The patterned silicon is then etched in Block 218 to form the tips as described above, the corresponding tips having a pyramidal shape (4-sided), and a height less than the thickness of the silicon membrane, due to the fact that the anisotropic etch terminates on the (111) facets of the silicon.

Method 200 then includes patterning and etching the silicon nitride cantilevers from the front side in Block 220. Once the probe devices are formed in this fashion, the tips may be sharpened in Block 222 prior to being removed from the wafer in Block 224. Oxidation sharpening can improve the sharpness and effective aspect ratio of the tips, and thus their performance, but it is not necessary. Again, with a sharper tip, the AFM has greater resolution (improved ability to image sub-nanometer features), as well as an improved ability to obtain images of deeper sample features such as trenches of semiconductor devices. Independent of whether the tip is sharpened, the corresponding performance characteristics (resonant frequency, etc.) of the resultant probe devices are maintained with the tips having an apex effective tip radius less than about 200 nm, and ideally less than about 10 nm. Notably, in Block 216, when the tips are patterned, the location of the tips can be selected based on a front-side measurement of the tip relative to a fixed end portion of the lever, a region/point which can be identified from the front-side based on the fact that the silicon is substantially translucent. This front-side positioning of where the tip is written, as described previously, allows precise control over formation of the cantilever geometry. If after the tip is located the tip/fixed end distance is determined to be non-ideal by the device fabricator the tip may be re-written. Finally, as described above, a reflective metal coating is provided on the back side of the lever in Block 223 to facilitate the efficient reflection of a light beam directed at the lever by the AFM optical detection scheme, described in the Background. In the end, probe devices having sub-50 micron levers can be repeatedly and reliably produced, even across wafers.

The corresponding fundamental resonant frequencies of probe devices produced in this fashion are maintained in a range of more than 750 kHz, and ideally more than 1 MHz, with fundamental resonant frequencies greater than 5 MHz being possible. Moreover, the corresponding quality factor Q of the cantilevers in free air is maintained at less than about 100 in free air when the tip is interacting with the sample. For the purposes of this application, "interacting with the sample" generally refers to the situation where the probe is close enough to a sample to sense at least the long range forces from the sample. In practice, this may be when the apex of the tip is within roughly 100 nm of the sample surface.

More particularly, in the preferred embodiments, the cantilever has a resonant frequency from roughly 700 kHz to more than 5 MHz. Depending on the desired tip-sample interaction force and cantilever resonant frequency, the cantilevers are typically 5-50 μm long by 3-20 μm wide, by 1-5 μm thick. For example, a cantilever with a length of 10 μm and a width of 5 μm and a thickness of 0.5 um and a 2 um tall tip will have a resonant frequency of roughly 6 MHz and a spring constant around 20 N/m. A cantilever around 35 μm long with a width of 15 μm and a thickness of 0.8 μm has a resonant frequency of roughly 800 kHz, with a spring constant around 6 N/m. In one embodiment, the applicants have built trapezoidal cantilevers with a cantilever length of 35 μm, a base width of 40 μm, tapering to an end width of 7 μm, with a 0.6 μm thickness and a 3 μm tall tip. These probes were coated with 5 nm of Ti and 40 nm of gold (Au) to form a reflective coating. These probes have a resonant frequency of 750 kHz and a spring constant of around 8 N/m.

The shape of the high bandwidth cantilever probes may be rectangular, triangular, trapezoidal or other arbitrary shape to achieve the desired resonant frequency and spring constant. The dimension and shape can be optimized for particular combinations of resonant frequency, spring constant and quality factor Q, for example by calculations including formulas available in the literature and/or by computational fluid dynamics and/or experimentation. The quality factor Q depends not only on the viscous damping of the lever but also a "squeeze film" effect as the tip and cantilever come close to the sample surface. This effect can be optimized by controlling the shape of the cantilever and the height of the tip. Taller tips move the bulk of the cantilever further from the sample surface and reduce the squeeze film effect, resulting in higher Q cantilevers. In some cases it is desirable to make shorter tips to reduce the Q and thus decrease the cantilever response time. Using short tips around 1 μm tall, the applicants have made high frequency cantilevers with Q values of less than 50 in air with the tip close to the sample surface.

Again, the cantilevers are generally fabricated with a sharp tip. In that regard, for most high resolution imaging applications a tip having an end radius of <20 nm is desired. However, for some applications, especially force measurements on soft samples, a duller tip is preferred.

Figure 9:
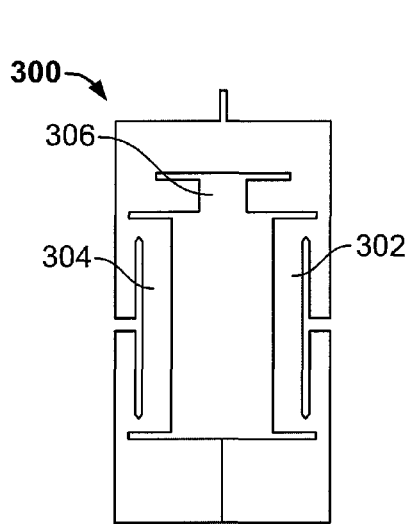
FIG. 9 is a schematic top plan view of a backside used to form probe devices with holding tabs sufficient to support the thin cantilevered probe devices in the wafer.

Turning to FIGS. 9 and 10, due to the fact that the silicon membrane produced according to the present invention is very thin (on the order of several microns), it is useful during processing to provide additional structure to support the probe devices within the wafer, thus preventing the probe devices from accidentally detaching from the wafer or otherwise being damaged. Because these high speed AFM probe devices are high cost components, maintaining probe device yield high is a priority to the probe device fabricator. The present invention employs etch stop V-groove holding tabs which not only insure high yield by substantially insuring the probe devices remain in the wafer until the fabricator wishes to remove them, but also provide a mechanical weak point to break the probe die from the wafer frame. In this fashion, the yield can be maintained at greater than 90%.

Figure 10A:
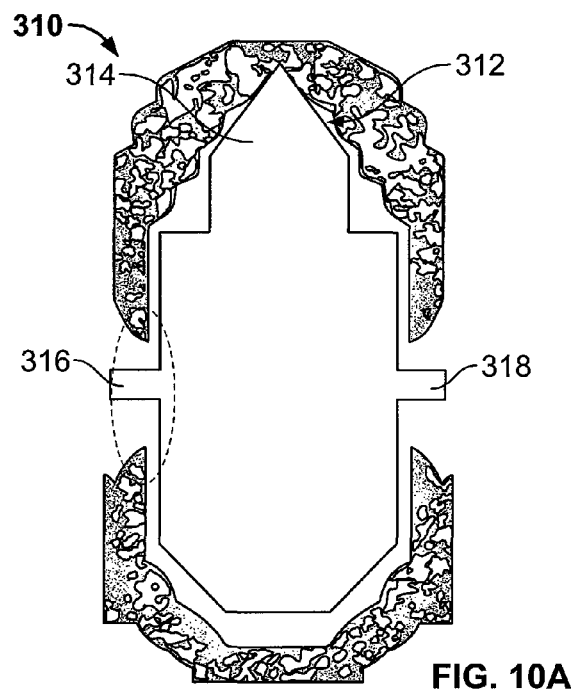
FIG. 10A is a front side image of a probe device fabricated with holding tabs, as illustrated in FIG. 9.

With more particular reference to FIG. 9, a mask design 300 for a backside silicon etch to produce the holding tabs is shown. V-grooves corresponding to the holding tabs are formed in the regions 302, 304 of the mask, while the probe devices lie in mask regions 306 of the mask. FIG. 10A illustrates a top-view image 310 of a probe device 312 from the front-side of the wafer, including a probe having a silicon nitride lever 314, once holding tabs 316, 318 are formed. Holding tabs 316, 318 provide sufficient structure to secure probe die from being removed from the wafer.

Figure 10B:
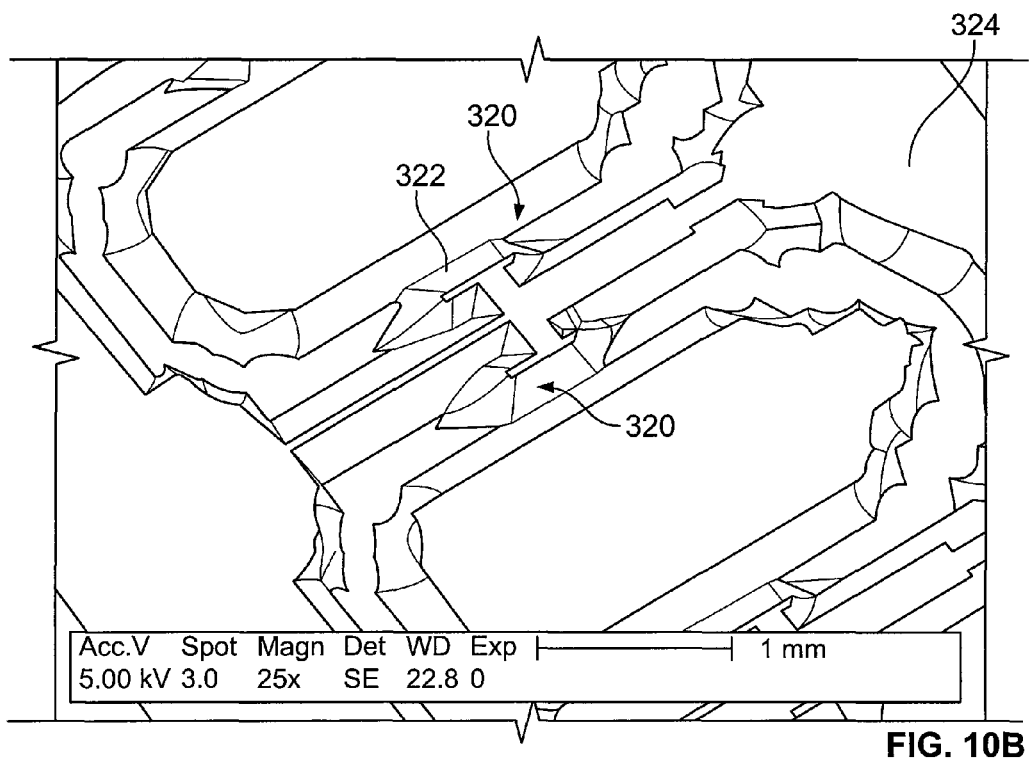
FIG. 10B is a back side image similar to FIG. 10A, illustrating the holding tabs formed using an anisotropic etch.

Referring to FIGS. 9 and 10B, to allow the probe devices to be readily removed yet not compromise the integrity of the holding tabs 316, 318, V-grooves are formed at regions 302, 304 using a back side anisotropic etch, similar to the formation of the tip height thickness monitor features described earlier. Once formed, as shown in FIG. 10B, the V-grooves 320 (with an inflection point 322 in the region of the tabs 316, 318-FIG. 10A) allow the tabs 316, 318 to be selectively broken along the V-groove to allow the probe devices to be removed from the substrate 324.

More particularly, when formed with this backside etch, V-grooves 320 have a depth that is significantly greater than the thickness of the silicon membrane at the locations at which the probe devices are formed. In this way, holding tabs 316, 318 are able adequately secure the resultant probe devices to the wafer 309, yet also provide a weak point at the V-groove discontinuity 322 to allow the probe device to be removed from the wafer 324. Notably, though two holding tabs are shown in the figures, one may only be required.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

We claim:

1. A method for fabricating a probe for a probe microscope comprising the steps of:
    providing a bulk single crystal silicon wafer;
    etching a region of the silicon wafer to a desired thickness;
    depositing silicon nitride on the backside of the etched silicon region;
    patterning and etching a tip from the etched silicon region;
    patterning and etching a cantilever from the silicon nitride; and
    wherein the cantilever has a length of less than about 50 µm and wherein the tip is positioned within about 5 µm of the free end of the cantilever and the effective radius of the tip is less than about 20 nm.

2. The method of claim 1, wherein the tip has a height of less than about 4 µm.

3. The method of claim 2, wherein a tip height monitor feature is formed to control the etching step.

4. The method of claim 2, wherein the tip height is controlled by monitoring a backside etch of the wafer.

5. The method of claim 4, wherein the monitoring step includes at least one of a) monitoring an etch rate associated with the backside etch, and b) visually inspecting the wafer during the backside etch.

6. The method of claim 2, wherein, during fabrication, the tip is positioned by measuring a distance between a tip pattern and the fixed end.

7. The method of claim 2, wherein the probe device is one of an array of probe devices fabricated from the substrate and the yield is greater than about 90%.

8. The method of claim 1, wherein the silicon nitride is supported by a thin film.

9. The method of claim 8, wherein the thin film is an oxide.

10. The method of claim 8, wherein the thickness of the silicon nitride is less than about 2 microns with a tolerance of about 0.1 micron.

11. The method of claim 10, wherein probe device yield is maintained greater than about 90%.

12. The method of claim 1, wherein the tip is oxidation sharpened.

13. The method of claim 1, wherein the tip is pyramid-shaped.

14. A method for fabricating a probe for a probe microscope comprising the steps of:
    etching a region of a silicon wafer to a desired thickness;
    depositing silicon nitride on the backside of the etched silicon region;
    patterning and etching a tip from the etched silicon region;
    patterning and etching a cantilever from the silicon nitride; and
    wherein the cantilever has a length of less than about 50 µm and wherein the tip is positioned within about 5 µm of the free end of the cantilever and the effective radius of the tip is less than about 20 nm.

15. The method of claim 14, wherein the silicon wafer is a bulk single crystal silicon wafer.

* * * * *